(12) United States Patent
Nakamura (10) Patent No.: US 8,947,787 B2
(45) Date of Patent: Feb. 3, 2015

(54) LENS BARREL

(71) Applicant: Nittoh Kogaku K. K, Suwa-shi, Nagano (JP)

(72) Inventor: Keisuke Nakamura, Suwa (JP)

(73) Assignee: Nittoh Kogaku K K (JP)

( * ) Notice: Subject to any disclaimer, the term of this patent is extended or adjusted under 35 U.S.C. 154(b) by 0 days.

(21) Appl. No.: 14/064,602

(22) Filed: Oct. 28, 2013

(65) Prior Publication Data

US 2014/0118842 A1 May 1, 2014

(30) Foreign Application Priority Data

Oct. 29, 2012 (JP) .................................. 2012-238197

(51) Int. Cl.
*G02B 15/14* (2006.01)
*G02B 7/10* (2006.01)

(52) U.S. Cl.
CPC ...................................... *G02B 7/102* (2013.01)
USPC ......................................... 359/700; 359/699

(58) Field of Classification Search
USPC ........................... 359/694–706, 819, 822–830
See application file for complete search history.

(56) References Cited

U.S. PATENT DOCUMENTS

2004/0051981 A1 * 3/2004 Nomura ........................ 359/822
2013/0271861 A1 * 10/2013 Fukino .......................... 359/823

FOREIGN PATENT DOCUMENTS

JP 2012145827 A 8/2012

* cited by examiner

*Primary Examiner* — Mahidere Sahle
(74) *Attorney, Agent, or Firm* — Cantor Colburn LLP (57) ABSTRACT

A lens barrel of the present invention comprises: first and second guide shafts arranged parallel to an optical axis X and provided in one of adjacent lens holding frames; first and second guide receiving holes formed in another of the adjacent lens holding frames for allowing the first and second guide shafts to be inserted therethrough and guided by the first and second guide shafts respectively; a first urging means of urging the one and the another of the adjacent lens holding frames along the direction of the optical axis; and a second urging means to rotate another of the adjacent lens holding frames in a circumferential direction of the first guide shaft. The first guide receiving hole is guided by the first guide shaft at two positions that are spaced apart from each other in the direction of the optical axis.

7 Claims, 5 Drawing Sheets

LENS BARREL

CROSS-REFERENCE TO RELATED APPLICATIONS

The present application relates to and claims priority from Japanese patent application No. 2012-238197 filed on Oct. 29, 2012, the content of which is incorporated herein by reference.

BACKGROUND OF THE INVENTION

1. Field of the Invention

The present invention relates to a lens barrel.

2. Description of Related Art

As a conventional art, it is known a lens barrel having a structure of moving lenses so as to perform focusing, zooming, and the like. In JP2012-145827A, for example, it is disclosed a structure of moving lenses, in which a lens holding frame for holding a lens to be moved is accommodated in cam barrels having cam grooves formed therein and in straight barrels having straight guide grooves formed therein, and the lens holding frame includes cam followers that are engaged with the cam grooves and the straight guide grooves. When the cam barrels are rotated, the lenses are moved in a direction of an optical axis.

However, in the case of the structure in which the cam grooves and the cam followers are engaged with each other, the cam followers need to be smoothly slid with respect to the cam grooves. Thus, the cam followers need to have diameters somewhat smaller than groove widths of the cam grooves. In other words, gaps need to be secured between circumferential surfaces of the cam followers and cam surfaces of the cam grooves. Therefore, differences (gaps) between those surfaces may cause backlash of the cam followers with respect to the cam grooves, tilting of the lens holding frame, variation in degree of the tilting of the lens holding frame, and the like. As a result, performance of the lenses may become unstable. In particular, in a case of a zoom lens, when the backlash, the tilting, and the variation in degree of the tilting occur in a fast lens, performance of the lens is significantly influenced.

BRIEF SUMMARY OF THE INVENTION

In view of the circumstances described above, it is an object of the present invention to provide a lens barrel including a lens holding frame with less backlash and a lower degree of tilting thereof.

In order to solve the above-mentioned problem, according to the present invention, there is provided a lens barrel, comprising: a plurality of lens holding frames each including a cam follower; a cam barrel including a cam groove formed to engage with the cam follower; a straight guide barrel including a straight guide groove formed to engage with the cam follower, the plurality of lens holding frames being movable through rotation of the cam barrel; a first guide shaft and a second guide shaft, which are arranged parallel to an optical axis of the lens barrel and provided in one of at least one pair of adjacent lens holding frames among the plurality of lens holding frames, for guiding a movement of another of the adjacent lens holding frames in a direction of the optical axis; a first guide receiving hole that allows the first guide shaft to be inserted therethrough and is guided by the first guide shaft; a second guide receiving hole that allows the second guide shaft to be inserted therethrough and is guided by the second guide shaft, the first guide receiving hole and the second guide receiving hole being formed in the another of the adjacent lens holding frames; first urging means for urging the one of the adjacent lens holding frames and the another of the adjacent lens holding frames in one of a direction of being spaced apart from each other along the direction of the optical axis and a direction of being brought close to each other along the direction of the optical axis; and second urging means capable of applying an urging force to the another of the adjacent lens holding frames so as to rotate the another of the adjacent lens holding frames in a circumferential direction of the first guide shaft, in which the first guide receiving hole is guided by the first guide shaft at two positions that are spaced apart from each other in the direction of the optical axis.

In the lens barrel according to the present invention, it is preferred that the second guide receiving hole have a size sufficient to allow an entire circumference of the second guide shaft to be loosely inserted therethrough.

It is further preferred that the first urging means generate a repulsive force against the one of the adjacent lens holding frames so as to urge the another of the adjacent lens holding frames.

In the lens barrel according to the present invention, it is preferred that the cam follower of the another of the adjacent lens holding frames avoid engaging with the straight guide groove.

In the lens barrel according to the present invention, it is preferred that the first urging means be a coil spring inserted onto the second guide shaft.

In the lens barrel according to the present invention, it is preferred that the first guide shaft and the cam follower of the another of the adjacent lens holding frames be arranged on the same side in a circumferential direction about the optical axis.

In the lens barrel according to the present invention, it is preferred that the one of the adjacent lens holding frames include an engagement portion for restricting a movement of the another of the adjacent lens holding frames in a direction of being spaced apart from the one of the adjacent lens holding frames along the direction of the optical axis.

According to the present invention, it is possible to provide a lens barrel including a lens holding frame with less backlash and a lower degree of tilting thereof.

BRIEF DESCRIPTION THE SEVERAL VIEWS OF THE DRAWINGS

Specific embodiments of the present invention will now be described, by way of example only, with reference to the accompanying drawings in which.

DETAILED DESCRIPTION OF THE INVENTION

Overview of Structure of Lens Barrel 1

Figure 1:
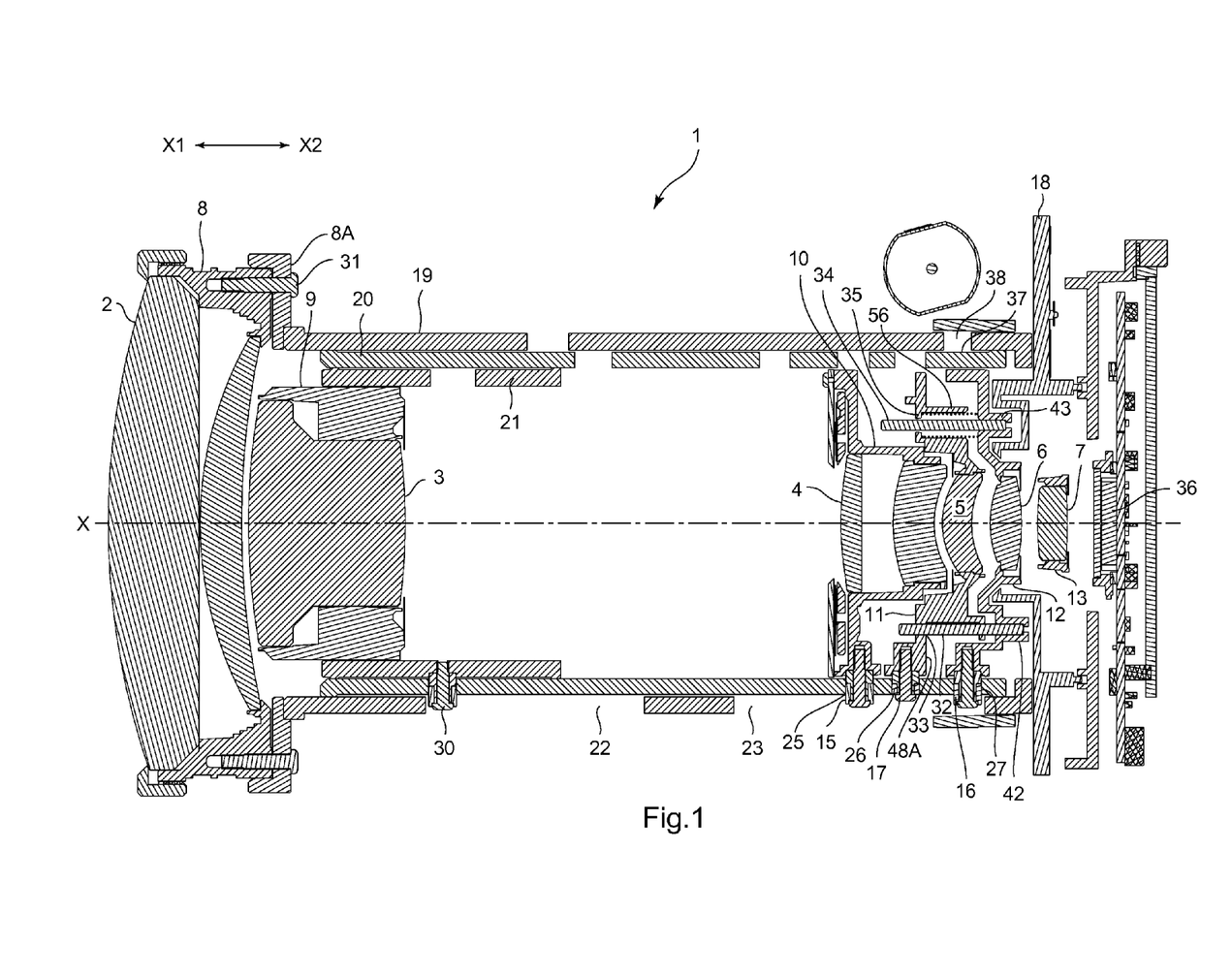
FIG. 1 is a sectional view of a schematic structure of a lens barrel in a plane including an optical axis according to an exemplary embodiment of the present invention.

With reference to FIG. 1, description is made of an overview of a structure of a lens barrel 1 according to an exemplary embodiment of the present invention. FIG. 1 is a sectional view of a structure of the lens barrel 1 in a plane including an optical axis X. Note that, in the following description, a photographing direction is referred to as "frontward" or "front side" (direction of arrow X1 in the drawings), and a direction opposite thereto is referred to as "rearward" or "rear side" (direction of arrow X2 in the drawings). Further, a direction away from the optical axis X is referred to as "outer circumferential direction" or "outer side," and a direction from a position away from the optical axis X toward the optical axis X is referred to as "inner circumferential direction" or "inner side."

As illustrated in FIG. 1, the lens barrel 1 includes six lens units of a first lens unit 2, a second lens unit 3, a third lens unit 4, a fourth lens unit 5, a fifth lens unit 6, and a sixth lens unit 7. The first lens unit 2 is held by a first lens holding frame 8, the second lens unit 3 is held by a second lens holding frame 9, the third lens unit 4 is held by a third lens holding frame 10, the fourth lens unit 5 is held by a fourth lens holding frame 11, the fifth lens unit 6 is held by a fifth lens holding frame 12, and the sixth lens unit 7 is held by a sixth lens holding frame 13.

Figure 2:
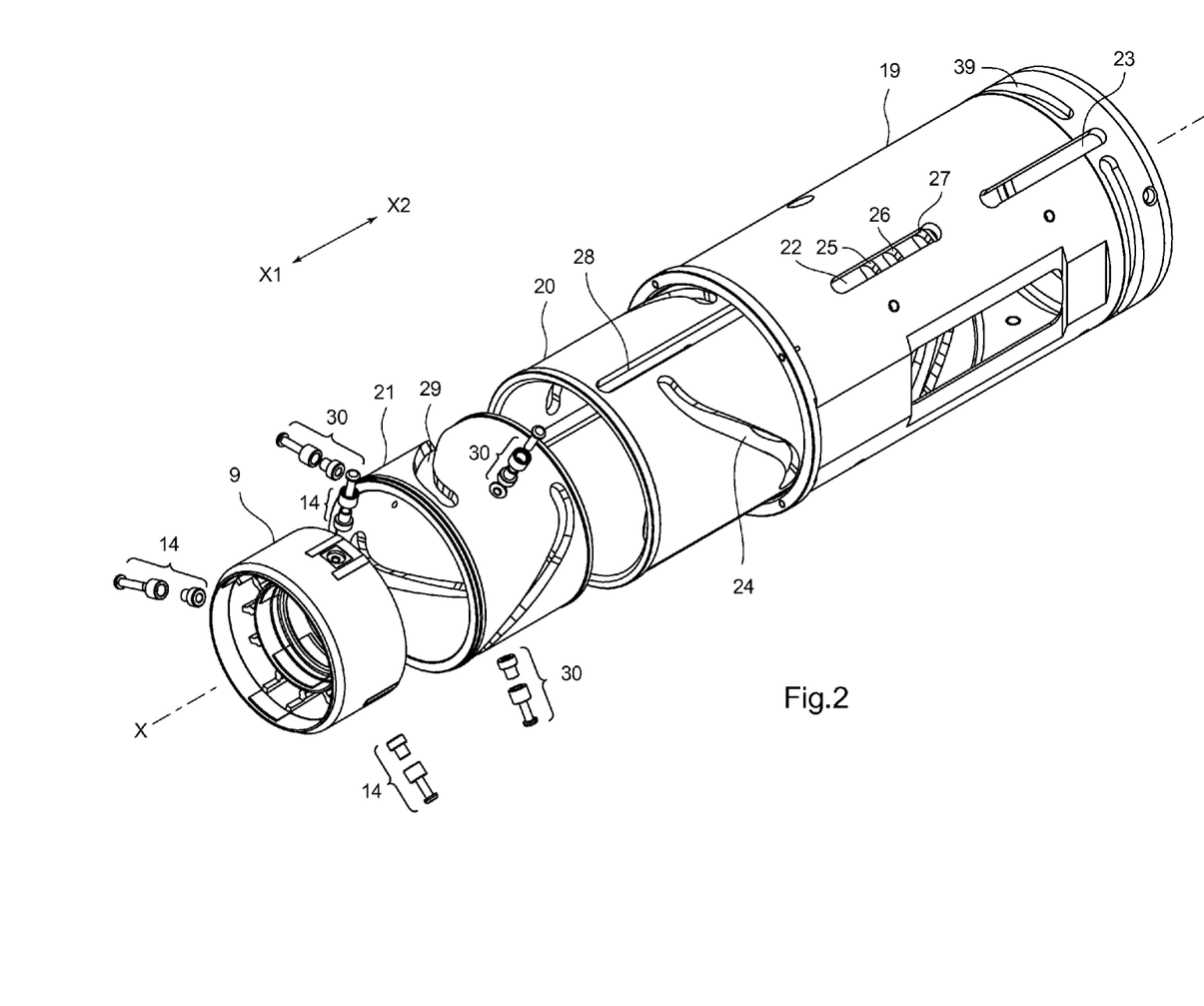
FIG. 2 is a structural perspective view of external appearances of a fixed barrel, a first cam barrel, a second cam barrel, and a second lens holding frame.

The second lens holding frame 9 includes three second cam followers 14 provided at intervals of 120 degrees about the optical axis X (refer to FIG. 2). Further, the third lens holding frame 10 similarly includes three third cam followers 15 provided at intervals of 120 degrees about the optical axis X. Still further, the fifth lens holding frame 12 similarly includes three fifth cam followers 16 provided at intervals of 120 degrees about the optical axis X. Meanwhile, the fourth lens holding frame 11 includes a single fourth cam follower 17.

The lens barrel 1 includes a fixed frame 18, a fixed barrel 19, a first cam barrel 20, and a second cam barrel 21. The fixed barrel 19 includes a rear end portion fixed to the fixed frame 18. The fixed frame 18 can be mounted to a casing of a camcorder, a television camera, a still camera, or the like. FIG. 2 is a structural perspective view of external appearances of the fixed barrel 19, the first cam barrel 20, the second cam barrel 21, and the second lens holding frame 9. As illustrated in FIG. 2, the first cam barrel 20 is arranged on an inner circumferential side of the fixed barrel 19, the second cam barrel 21 is arranged on an inner circumferential side of the first cam barrel 20, and the second lens holding frame 9 is arranged on an inner circumferential side of the second cam barrel 21.

The fixed barrel 19 is provided with first straight guide grooves 22 and second straight guide grooves 23 each extending parallel to the optical axis X in the front and rear directions. The first straight guide grooves 22 are arranged at three positions at intervals of 20 degrees about the optical axis X. The second straight guide grooves 23 are similarly arranged at three positions at intervals of 120 degrees about the optical axis X. In this embodiment, the first straight guide grooves 22 and the second straight guide grooves 23 are arranged at positions of being aligned with each other in the front and rear directions.

The first cam barrel 20 includes first cam grooves 24, second cam grooves 25, third cam grooves 26, and fourth cam grooves 27 formed in the stated order from the front side. The cam grooves are each formed at three positions at intervals of 120 degrees about the optical axis X. Further, the first cam barrel 20 includes third straight guide grooves 28 formed to extend parallel to the optical axis X in the front and rear directions. The third straight guide grooves 28 are arranged at three positions at intervals of 120 degrees about the optical axis X.

The second cam barrel 21 includes fifth cam grooves 29 formed at three positions at intervals of 120 degrees about the optical axis X. Further, the second cam barrel 21 includes three sixth cam followers 30 provided at intervals of 120 degrees about the optical axis X.

The first lens holding frame 8 is mounted to a flange portion 8A projecting in the outer circumferential direction from a distal end portion of the fixed barrel 19, and is fixed with screws 31.

The second cam followers 14 of the second lens holding frame 9 are inserted into the fifth cam grooves 29 and the third straight guide grooves 28 so as to be engageable with the fifth cam grooves 29 and the third straight guide grooves 28. The sixth cam followers 30 of the second cam barrel 21 are inserted into the first cam grooves 24 and the first straight guide grooves 22 so as to be engageable with the first cam grooves 24 and the first straight guide grooves 22. The third cam followers 15 of the third lens holding frame 10 are inserted into the second cam grooves 25 and the second straight guide grooves 23 so as to be engageable with the second cam grooves 25 and the second straight guide grooves 23. The fourth cam follower 17 of the fourth lens holding frame 11 is inserted into one of the third cam grooves 26 so as to be engageable with the one of the third cam grooves 26.

Note that, only one fourth cam follower 17 is provided, and hence is inserted into only one of the third cam grooves 26 formed at the three positions. Further, as described below, the fourth lens holding frame 11 includes a first guide receiving hole 33 that allows a first guide shaft 32 to be inserted therethrough, and a second guide receiving hole 35 that allows a second guide shaft 34 to be inserted therethrough (refer to FIG. 3). The fifth cam followers 16 of the fifth lens holding frame 12 are inserted into the fourth cam grooves 27 and the second straight guide grooves 23 so as to be engageable with the fourth cam grooves 27 and the second straight guide grooves 23. In addition, the fifth lens holding frame 12 includes the first guide shaft 32 and the second guide shaft 34 each provided to extend frontward. The first guide shaft 32 is inserted through the first guide receiving hole 33 provided to the fourth lens holding frame 11, and the second guide shaft 34 is similarly inserted through the second guide receiving hole 35 provided to the fourth lens holding frame 11.

The sixth lens holding frame 13 is supported by a fixed holder through intermediation of a guide shaft (not shown), and in addition, can be moved frontward and rearward in a direction of the optical axis X by a motor (not shown) while being guided by the guide shaft. On the rear side with respect to the sixth lens unit 7, an image pickup element 36 such as a CCD is arranged.

[Overview of Operations of Lens Barrel 1]

Description is made of an overview of operations of the lens barrel 1 structured as described above. In the lens barrel 1 according to this embodiment, the first lens unit 2 is fixed, the second lens unit 3 to the fifth lens unit 6 are moved to realize a magnification varying operation, and the sixth lens unit 7 is moved to realize a focus adjustment operation.

The first cam barrel 20 includes a rear portion provided therearound with a gear portion 37. Further, the fixed barrel 19 has a rear portion at which a circumferentially long slit groove 38 is formed in conformity with the gear portion 37 of the first cam barrel 20. In addition, a gear (not shown) is meshed with the gear portion 37 of the first cam barrel 20 through the slit groove 38. This gear is rotated by a drive motor (not shown), and the first cam barrel 20 is rotated through the rotation of the drive motor. Through the rotation of the first cam barrel 20, the second lens holding frame 9, the third lens holding frame 10, the fourth lens holding frame 11, and the fifth lens holding frame 12 are moved in the front and rear directions so as to realize the magnification varying operation. Further, an AF motor is driven in accordance with a focusing condition of an image formed on an image pickup surface of the image pickup element 36 so as to move frontward and rearward the sixth lens holding frame 13. In this way, a focusing operation is realized.

When the first cam barrel 20 is rotated, the fifth lens holding frame 12 including the fifth cam followers 16 engaged with the fourth cam grooves 27 and the second straight guide grooves 23 is moved frontward and rearward along the fourth cam grooves 27 while being restricted by the second straight guide grooves 23 from the rotation about the optical axis X (guided straight). When the first cam barrel 20 is rotated, the third lens holding frame 10 including the third cam followers 15 engaged with the second cam grooves 25 and the second straight guide grooves 23 is moved frontward and rearward along the second cam grooves 25 while being restricted by the second straight guide grooves 23 from the rotation about the optical axis X (guided straight). When the first cam barrel 20 is rotated, the second cam barrel 21 including the sixth cam followers 30 engaged with the first cam grooves 24 and the first straight guide grooves 22 is moved frontward and rearward along the first cam grooves 24 while being restricted by the first straight guide grooves 22 from the rotation about the optical axis X (guided straight). Note that, the fixed barrel 19 functions as a straight guide barrel for guiding straight the fifth lens holding frame 12, the third lens holding frame 10, and the second cam barrel 21.

When the first cam barrel 20 is rotated, the fourth lens holding frame 11 including the fourth cam follower 17 which is engaged with one of the third cam grooves 26, the first guide receiving hole 33 through which the first guide shaft 32 is inserted, and the second guide receiving hole 35 through which the second guide shaft 34 is inserted is moved frontward and rearward along the one of the third cam grooves 26 while being restricted by the first guide shaft 32 and the second guide shaft 34 from the rotation about the optical axis X (guided straight).

When the first cam barrel 20 is rotated, the second lens holding frame 9 including the second cam followers 14 engaged with the fifth cam grooves 29 of the second cam barrel 21 and the third straight guide grooves 28 of the first cam barrel 20 is rotated about the optical axis X along with the rotation of the first cam barrel 20, and moved frontward and rearward along the fifth cam grooves 29. The frontward and rearward movements of the second lens holding frame 9 are resultants of the frontward and rearward movements of the second cam barrel 21 and the frontward and rearward movements along the fifth cam grooves 29.

[Holding Structure of Fifth Lens Holding Frame 12 for Fourth Lens Holding Frame 11]

Figure 3:
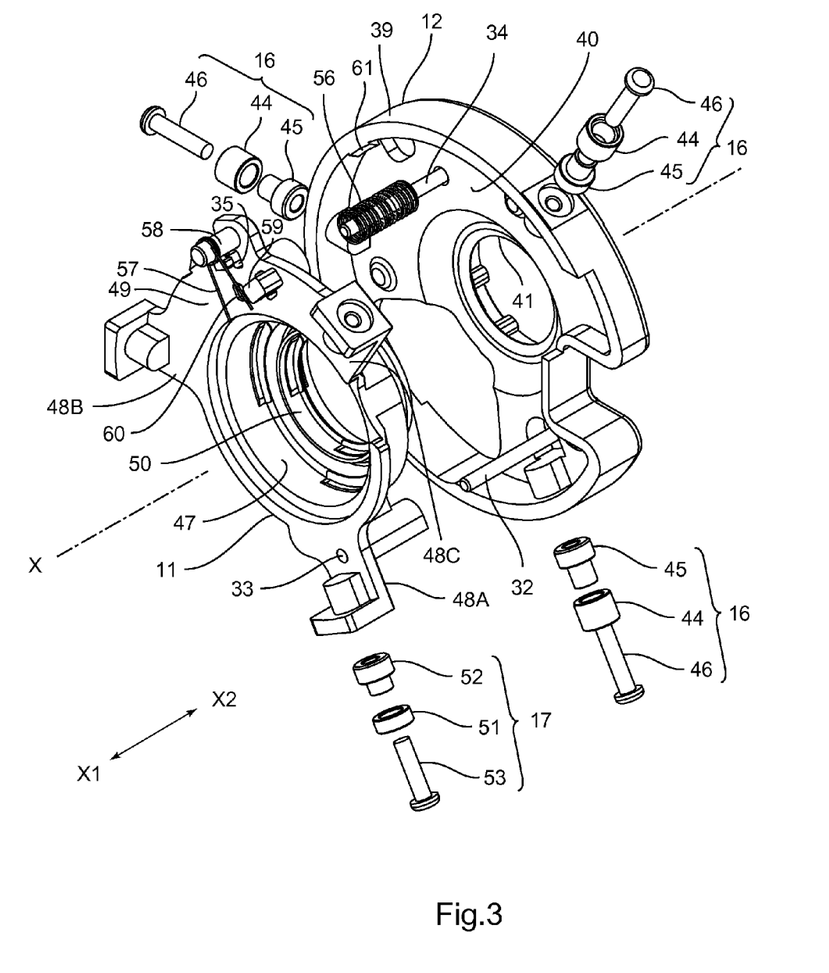
FIG. 3 is an exploded perspective view of structures of a fourth lens holding frame and a fifth lens holding frame.
Figure 4:
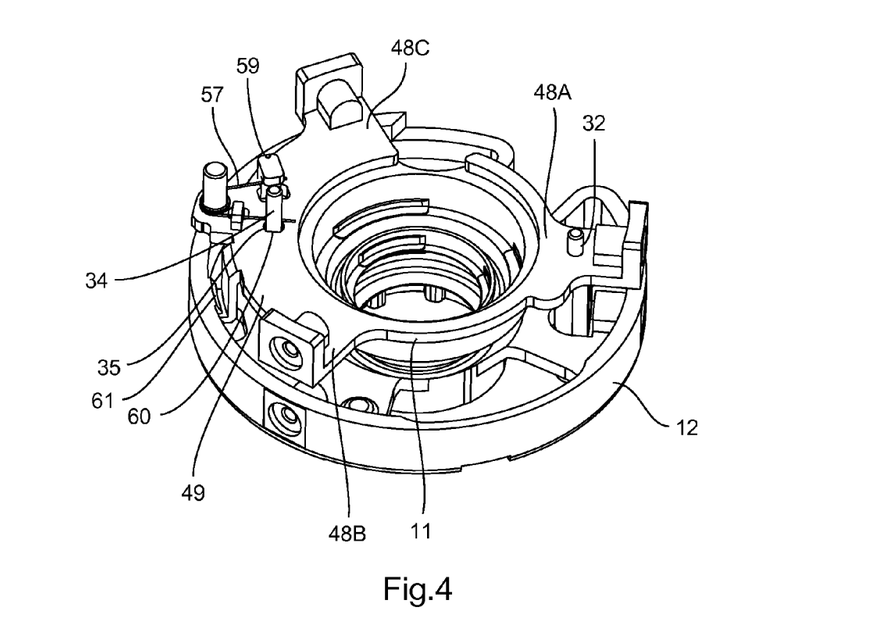
FIG. 4 is a perspective view illustrating a state in which the fourth lens holding frame is held by the fifth lens holding frame.
Figure 5:
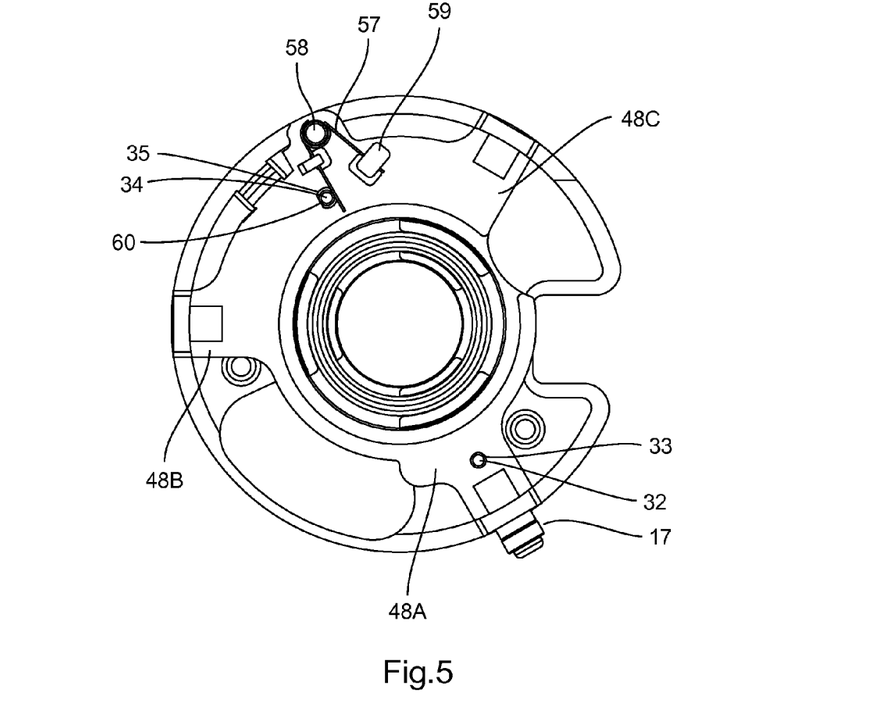
FIG. 5 is a front view illustrating the state in which the fourth lens holding frame is held by the fifth lens holding frame.

In this context, with reference to FIGS. 3 to 5, description is made of a holding structure of the fifth lens holding frame 12 for the fourth lens holding frame 11. FIG. 3 is an exploded perspective view of structures of the fourth lens holding frame 11 and the fifth lens holding frame 12. FIG. 4 is a perspective view illustrating a state in which the fourth lens holding frame 11 is held by the fifth lens holding frame 12. FIG. 5 is a front view illustrating the state in which the fourth lens holding frame 11 is held by the fifth lens holding frame 12.

[Structure of Fifth Lens Holding Frame 12]

The fifth lens holding frame 12 includes a cylindrical portion 39 having a central axis arranged parallel to the optical axis X, and a flange portion 40 arranged on an inner circumferential side of the cylindrical portion 39 and having a surface orthogonal to the optical axis X. The flange portion 40 includes a lens holding portion 41 for holding the fifth lens unit 6.

The flange portion 40 has the first guide shaft 32 and the second guide shaft 34 mounted parallel to the optical axis X in the frontward direction, in other words, toward a side on which the fourth lens holding frame 11 is arranged. The first guide shaft 32 and the second guide shaft 34 are arranged across the optical axis X. In other words, the first guide shaft 32 and the second guide shaft 34 are arranged at intervals of 180 degrees about the optical axis X. The first guide shaft 32 and the second guide shaft 34 are formed, for example, of a metal such as stainless steel. In order to reduce sliding friction, it is preferred that plating treatment, Teflon (trademark) coating, or the like be performed on circumferential surfaces of the first guide shaft 32 and the second guide shaft 34.

The first guide shaft 32 is mounted in a fixed state to the flange portion 40 by being press-fitted to a sleeve 42 provided to a rear surface of the flange portion 40 (refer to FIG. 1). The second guide shaft 34 is similarly mounted in a fixed state to the flange portion 40 by being press-fitted to a sleeve 43 provided to the rear surface of the flange portion 40 (refer to FIG. 1). The cylindrical portion 39, the flange portion 40, and the sleeves 42 and 43 are formed integrally with each other through a molding process.

The cylindrical portion 39 has the fifth cam followers 16 mounted on an outer surface thereof. The fifth cam followers 16 each include a block portion 44, a support portion 45 for supporting the block portion 44 in a rotatable manner with respect to the cylindrical portion 39, and a screw 46 for mounting the block portion 44 and the support portion 45 to the cylindrical portion 39. The fifth cam followers 16 are provided at three positions at intervals of 120 degrees about the optical axis X. The block portion 44 is rotated about a central axis of the support portion 45, and hence the fifth cam followers 16 can be smoothly moved with respect to the fourth cam grooves 27 and the second straight guide grooves 23.

[Structure of Fourth Lens Holding Frame 11]

The fourth lens holding frame 11 includes a cylindrical portion 47 having a central axis arranged parallel to the optical axis X, three arm portions 48A, 48B, and 48C provided toward an outer side of the cylindrical portion 47, and a flange portion 49 provided between the arm portions 48B and 48C and having a surface orthogonal to the optical axis X. The cylindrical portion 47 includes an inner circumferential portion formed as a lens holding portion 50 for holding the fourth lens unit 5.

The arm portion 48A has the fourth cam follower 17 mounted at a distal end thereof. The fourth cam follower 17 includes a block portion 51, a support portion 52 for supporting the block portion 51 in a rotatable manner with respect to the distal end of the arm portion 48A, and a screw 53 for mounting the block portion 51 and the support portion 52 to the arm portion 48A. The block portion 51 is rotated about a central axis of the support portion 52, and hence the fourth cam follower 17 can be smoothly moved with respect to corresponding one of the third cam grooves 26.

The fourth cam follower 17 is provided only to the arm portion 48A, and hence provided to none of the other arm portions 48B and 48C. Thus, the fourth lens holding frame 11 is engaged with the first cam barrel 20 through intermediation of the fourth cam follower 17 engaged only with the corresponding one of the three third cam grooves 26 provided to the first cam barrel 20. In other words, movements of the fourth lens holding frame 11 in the front and rear directions are controlled by an action of the corresponding one of the third cam grooves 26 and the single fourth cam follower 17 engaged therewith.

[First Guide Shaft 32 and First Guide Receiving Hole 33]

Figure 6:
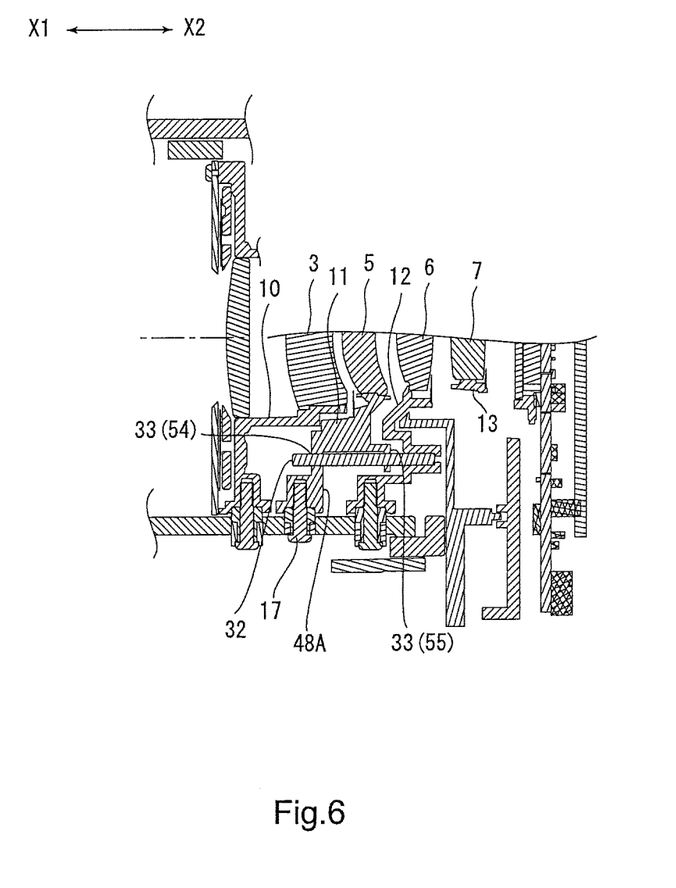
FIG. 6 is an enlarged view of a part including a front guide receiving portion and a rear guide receiving portion of the fourth lens holding frame.

The arm portion 48A is provided with the first guide receiving hole 33. The first guide shaft 32 is inserted through the first guide receiving hole 33. As illustrated in FIG. 6, the first guide receiving hole 33 includes a front guide receiving portion 54 and a rear guide receiving portion 55 arranged in the front and rear directions, and the first guide shaft 32 abuts against two positions of the front guide receiving portion 54 and the rear guide receiving portion 55. A void is formed between the front guide receiving portion 54 and the rear guide receiving portion 55 so as to keep the fourth lens holding frame 11 out of contact with the first guide shaft 32. The front guide receiving portion 54 and the rear guide receiving portion 55 each serve as a hole portion held in abutment against an entire circumference of the first guide shaft 32. In other words, the first guide shaft 32 is inserted through the front guide receiving portion 54 and the rear guide receiving portion 55 without backlash.

[Second Guide Shaft 34 and Second Guide Receiving Hole 35]

The second guide receiving hole 35 is provided to the flange portion 49 so as to allow the second guide shaft 34 to be inserted therethrough. The second guide receiving hole 35 is formed to have a size sufficient to allow the second guide shaft 34 to be loosely inserted therethrough. In other words, the second guide receiving hole 35 has an opening formed to have a size sufficient to secure a gap around an entire circumference of the second guide shaft 34 to be inserted therethrough.

The fourth lens holding frame 11 is held by the fifth lens holding frame 12 through intermediation of the first guide shaft 32 inserted through the first guide receiving hole 33 and the second guide shaft 34 inserted through the second guide receiving hole 35. In other words, the fourth lens holding frame 11 is held to be movable in the front and rear directions with respect to the fifth lens holding frame 12 while being guided by the first guide shaft 32 and the second guide shaft 34.

As described above, when the first cam barrel 20 is rotated, the fifth lens holding frame 12 including the fifth cam followers 16 engaged with the fourth cam grooves 27 and the second straight guide grooves 23 is moved frontward and rearward along the fourth cam grooves 27 while being restricted by the second straight guide grooves 23 from the rotation about the optical axis X. Further, when the first cam barrel 20 is rotated, the fourth lens holding frame 11 including the fourth cam follower 17 which is engaged with one of the third cam grooves 26, the first guide receiving hole 33 through which the first guide shaft 32 is inserted, and the second guide receiving hole 35 through which the second guide shaft 34 is inserted is moved frontward and rearward along the one of the third cam grooves 26 while being restricted by the first guide shaft 32 and the second guide shaft 34 from the rotation about the optical axis X (guided straight).

The fourth lens holding frame 11 is supported by the fifth lens holding frame 12 also through intermediation of the front guide receiving portion 54 and the rear guide receiving portion 55 arranged at the two front and rear positions. In other words, the front guide receiving portion 54 and the rear guide receiving portion 55 abut against the first guide shaft 32 so as to restrict the fourth lens holding frame 11 from being tilted in the front and rear directions (inclination in a direction in which an optical axis of the fourth lens unit 5 intersects with the optical axis X).

By the way, in general, the lens holding frame is restricted from being tilted (inclined) in the front and rear directions through engagement of the cam followers on the three sides (at intervals of 120 degrees about an image pickup optical axis) with the cam grooves. Thus, when engagement states of the cam followers and the cam grooves on the three sides are non-uniform, for example, under a state in which a cam follower and a cam groove on one side are not engaged with each other and cam followers and cam grooves on the other two sides are engaged with each other, the lens holding frame may be tilted. Further, when there are errors between forming positions of the three cam grooves, a degree of tilting of the lens holding frame may vary along with shift of engagement positions of the cam followers and the cam grooves.

Meanwhile, the fourth lens holding frame 11 is restricted from being tilted in the front and rear directions by the single first guide shaft 32. Thus, regardless of an engagement state of the fourth cam follower 17 and the corresponding one of the third cam grooves 26, for example, regardless of whether or not a gap is formed between cam surfaces of the fourth cam follower 17 and the corresponding one of the third cam grooves 26, the fourth lens holding frame 11 can be suppressed from being tilted in the front and rear directions.

The fourth lens holding frame 11 is thus restricted from being tilted in the front and rear directions by the single first guide shaft 32. In addition, for the engagement of the cam followers and the cam grooves, only the single fourth cam follower 17 and the corresponding one of the third cam grooves 26 are engaged with each other. In other words, the movements of the fourth lens holding frame 11 in the front and rear directions are controlled by one of the third cam grooves 26 and the single fourth cam follower 17. Meanwhile, when the movements of the fourth lens holding frame 11 are controlled by all the three third cam grooves 26, performance of the lenses may be deteriorated when errors occur in the forming positions of the three third cam grooves 26. However, as in this embodiment, when the movements of the fourth lens holding frame 11 are controlled by only one of the third cam grooves 26 and the single fourth cam follower 17, there is no risk of the deterioration in performance of the lenses.

[Coil Spring 56]

At a position between the fourth lens holding frame 11 and the fifth lens holding frame 12, there is provided a coil spring 56 as first urging means. The coil spring 56 includes an inner circumferential portion through which the second guide shaft 34 is allowed to pass, and is supported by the fifth lens holding frame 12. Further, the coil spring 56 is arranged to urge the fourth lens holding frame 11 in a direction of increasing a clearance between the fourth lens holding frame 11 and the fifth lens holding frame 12. In other words, the coil spring 56 generates a repulsive force against the fifth lens holding frame 12 so as to urge the fourth lens holding frame 11 frontward.

In this way, when the fourth lens holding frame 11 is urged frontward, the abutment state between the first guide shaft 32 and the first guide receiving hole 33 (front guide receiving portion 54 and rear guide receiving portion 55), and the engagement state between the fourth cam follower 17 and the corresponding one of the third cam grooves 26 can be stably maintained.

[Torsion Spring 57]

The fourth lens holding frame 11 includes a torsion spring 57. The torsion spring 57 is supported by a support shaft 58 provided to project frontward from a front surface of the flange portion 49 of the fourth lens holding frame 11. The torsion spring 57 includes both end portions held in contact with the second guide shaft 34 projected frontward through the second guide receiving hole 35 from the flange portion 49, and with a spring receiving portion 59 provided to project from the front surface of the flange portion 49. In this way, the torsion spring 57 applies a pressing force to the second guide shaft 34 and the spring receiving portion 59. In other words, the torsion spring 57 is provided to apply a force to the fourth lens holding frame 11 so as to rotate the fourth lens holding frame 11 in a circumferential direction of the first guide shaft 32. With this, an abutment surface 60 that is a part of an inner circumferential surface of the second guide receiving hole 35 and located on a side of circumferential direction of the first guide shaft 32 is urged and brought into abutment against the second guide shaft 34. The abutment surface 60 is a flat surface orthogonal to the circumferential direction of the first guide shaft 32. When the abutment surface 60 is urged and brought into abutment against the second guide shaft 34, the fourth lens holding frame 11 is restricted from being rotated in the circumferential direction of the first guide shaft 32. Note that, a forming position and a size of the second guide receiving hole 35, a diameter of the second guide shaft 34, and the like are set so as to align the optical axis of the fourth lens unit 5 with the optical axis X under the state in which the fourth lens holding frame 11 is restricted by the second guide shaft 34 from being rotated in the circumferential direction of the first guide shaft 32 as described above.

[Main Advantages of this Embodiment]

Of the second lens holding frame 9 to the fifth lens holding frame 12 of the lens barrel 1 according to this embodiment, the fifth lens holding frame 12, which is one lens holding frame of a pair of the fourth lens holding frame 11 and the fifth lens holding frame 12 adjacent to each other, includes the first guide shaft 32 and the second guide shaft 34. The first guide shaft 32 and the second guide shaft 34 are each parallel to the optical axis X. The first guide shaft 32 and the second guide shaft 34 are arranged at intervals of 180 degrees about the optical axis X. In other words, the optical axis X and axes of the first guide shaft 32 and the second guide shaft 34 are arranged in the same plane. The first guide shaft 32 passes through the first guide receiving hole 33, and the second guide shaft 34 passes through the second guide receiving hole 35. In this way, the fourth lens holding frame 11 is supported by the first guide shaft 32 and the second guide shaft 34 that are two guide shafts arranged across the optical axis X, and hence is restricted from being rotated about the optical axis X.

It is preferred that the first guide shaft 32 and the second guide shaft 34 be arranged at intervals of 180 degrees about the optical axis X in order to stably guide the fourth lens holding frame 11 with respect to the first guide shaft 32 and the second guide shaft 34. However, the first guide shaft 32 and the second guide shaft 34 need not necessarily be arranged at intervals of 180 degrees. This is because, as long as the first guide shaft 32 and the second guide shaft 34 are arranged apart from each other in the circumferential direction about the optical axis X, the fourth lens holding frame 11 can be restricted from being rotated in the circumferential direction about the optical axis X.

The fourth lens holding frame 11, which is another lens holding frame of the pair of the fourth lens holding frame 11 and the fifth lens holding frame 12, is provided with the first guide receiving hole 33. The first guide shaft 32 is inserted through the first guide receiving hole 33, and the first guide receiving hole 33 is guided by the first guide shaft 32. The first guide receiving hole 33 abuts against the first guide shaft 32 at the two positions of the front guide receiving portion 54 and the rear guide receiving portion 55 arranged apart from each other in the direction of the optical axis X. In other words, the fourth lens holding frame 11 is supported by the first guide shaft 32 at the two positions in the front and rear, specifically, through intermediation of the front guide receiving portion 54 and the rear guide receiving portion 55 arranged in the front and rear along the direction of the optical axis X, and hence is suppressed from being tilted in the front and rear directions. The structure in which the fourth lens holding frame 11 is restricted by the first guide shaft 32 and the first guide receiving hole 33 from being tilted frontward and rearward in this way is less influenced, for example, by the errors between forming positions of a plurality of cam grooves than in a case where tilting is restricted by cam grooves and cam followers. Thus, the fourth lens holding frame 11 can be effectively suppressed from being tilted, with the result that the deterioration in performance of the lenses can be suppressed.

It is preferred that the clearance between the front guide receiving portion 54 and the rear guide receiving portion 55 in the front and rear directions be at least equal to or larger than a thickness of the fourth lens unit 5 in the front and rear directions. However, an increase of the clearance is liable to involve an increase in size of the lens barrel 1 (in particular, increase in size in the front and rear directions). Thus, when the clearance is increased as much as possible without exceeding the thickness of the fourth lens holding frame 11 in the front and rear directions, the fourth lens holding frame 11 is less liable to be tilted while suppressing the increase in size of the lens barrel 1.

The fourth lens holding frame 11 is urged frontward, in other words, in a direction of being spaced apart from the fifth lens holding frame 12 by the coil spring 56 as the first urging means. In this way, when the fourth lens holding frame 11 is urged frontward, the abutment state between the first guide shaft 32 and the first guide receiving hole 33, and the engagement state between the fourth cam follower 17 and the corresponding one of the third cam grooves 26 can be stably maintained. As a result, the deterioration in performance of the lenses can be suppressed. Note that, the coil spring 56 may be configured to apply an urging force of drawing the fourth lens holding frame 11 toward the fifth lens holding frame 12.

Further, a torsion spring and a leaf spring may be used instead of the coil spring 56. However, the coil spring 56 can be arranged as the first urging means within a small space.

The torsion spring 57 as the second urging means is arranged between the second guide shaft 34 projected frontward through the second guide receiving hole 35 from the flange portion 49, and the spring receiving portion 59 provided to project from the front surface of the flange portion 49, and applies an urging force to the fourth lens holding frame 11 so as to rotate the fourth lens holding frame 11 in the circumferential direction of the first guide shaft 32. With this, the abutment surface 60 that is a part of the inner circumferential surface of the second guide receiving hole 35 and located on the side of the circumferential direction of the first guide shaft 32 is urged and brought into abutment against the second guide shaft 34. As a result, the fourth lens holding frame 11 is prevented from being rotated in the circumferential direction of the first guide shaft 32, and the deterioration in performance of the lenses at the time of the movements of the fourth lens holding frame 11 in the front and rear directions can be suppressed.

As described above in this embodiment, the one end of the torsion spring 57 is engaged with the second guide shaft 34 projecting frontward through the second guide receiving hole 35 from the flange portion 49, and the another end thereof is engaged with the spring receiving portion 59 projecting from the front surface of the flange portion 49. Alternatively, the engagement portion on the one end side of the torsion spring 57 may be provided on the fifth lens holding frame 12 side. However, the structure in which the engagement portion on the one end side of the torsion spring 57 is engaged with the second guide shaft 34 is simpler than the structure in which the engagement portion is provided on the fifth lens holding frame 12 side, and the lens barrel 1 can be suppressed from being increased in size.

The second guide receiving hole 35 is formed to have the size sufficient to allow the second guide shaft 34 to be loosely inserted therethrough. In other words, the second guide receiving hole 35 has the opening formed to have the size sufficient to secure the gap around the entire circumference of the second guide shaft 34 to be inserted therethrough. Thus, even when the second guide shaft 34 is curved or less parallel to the optical axis X, the movements of the fourth lens holding frame 11 in the front and rear directions are less liable to be hindered.

Further, as described above, the fourth lens holding frame 11 is urged in the circumferential direction of the first guide shaft 32 by the torsion spring 57, and hence the second guide receiving hole 35 is held in abutment against the second guide shaft 34 only in the circumferential direction of the first guide shaft 32. When the second guide receiving hole 35 is held in abutment against a part of the second guide shaft 34, the fourth lens holding frame 11 can be guided straight along the optical axis X mainly by the first guide shaft 32. With this, the fourth lens holding frame 11 can be more smoothly moved in the front and rear directions.

For example, when an entire inner circumference of the second guide receiving hole 35 is held in abutment against the second guide shaft 34, the fourth lens holding frame 11 is guided straight by the two shafts of the first guide shaft 32 and the second guide shaft 34. Thus, when a parallelism between the first guide shaft 32 and the second guide shaft 34 is low, the fourth lens holding frame 11 may not be smoothly moved.

In contrast, as described above, when the second guide receiving hole 35 is held in abutment against a part of the second guide shaft 34, the smoothness of the movements of the fourth lens holding frame 11 is less influenced by the parallelism between the first guide shaft 32 and the second guide shaft 34. Further, when the second guide shaft 34 and the second guide receiving hole 35 are held in abutment against each other in a smaller area, the sliding friction between the second guide shaft 34 and the second guide receiving hole 35 can be reduced. Note that, a size of the gap to be formed between the second guide receiving hole 35 and the second guide shaft 34 excluding the abutment part need not be large. The size of the gap is not particularly limited as long as insufficiency of the parallelism between the first guide shaft 32 and the second guide shaft 34 can be compensated. Even when the first guide shaft 32 and the second guide shaft 34 are perfectly parallel to each other, as described above, the sliding friction between the second guide shaft 34 and the second guide receiving hole 35 can be reduced by the gap thus formed.

In the lens barrel 1, the fourth cam follower 17 is engaged with none of the straight guide grooves. In other words, the fourth lens holding frame 11 is guided straight by the first guide shaft 32 and the first guide receiving hole 33. The fourth cam follower 17 is engaged with none of the straight guide grooves (for example, second straight guide grooves 23), and hence sliding friction with respect to the straight guide grooves can be eliminated. As a result, the fourth lens holding frame 11 is smoothly moved in the front and rear directions.

In the lens barrel 1, the fourth cam follower 17 is arranged at the arm portion 48A provided with the first guide receiving hole 33 that allows the first guide shaft 32 to be inserted therethrough. In other words, the fourth cam follower 17 is arranged on the same side as the first guide shaft 32 in the circumferential direction about the optical axis X. In still other words, a drive force in the front and rear directions can be applied to the fourth lens holding frame 11 at a shorter distance to the first guide shaft 32 than that in a case where the fourth cam follower 17 is provided to the arm portion 48B or the arm portion 48C. Thus, when the fourth cam follower 17 is provided to the arm portion 48A, the fourth lens holding frame 11 is less liable to be tilted in the front and rear directions than in the case where the fourth cam follower 17 is provided to the arm portion 48B or the arm portion 48C.

Note that, the arm portion 48B and the arm portion 48C may be omitted from the lens barrel 1. However, when the arm portions 48A, 48B, and 48C are formed into substantially the uniform shape and at equal intervals (intervals of 120 degrees) about the optical axis X, local deformation due to shrinkage that may occur in the molding process for manufacturing the fourth lens holding frame 11 can be suppressed. When the local deformation is suppressed in this way, the fourth lens unit 5 held by the fourth lens holding frame 11 can be suppressed from being tilted. As a result, performance of the lenses can be enhanced.

Note that, the cylindrical portion 39 of the fifth lens holding frame 12 includes a front end provided with a protruding portion 61 projected inward. The protruding portion 61 functions as an engagement portion that is engaged with the front surface of the flange portion 49 of the fourth lens holding frame 11 held by the fifth lens holding frame 12. The protruding portion 61 is capable of preventing the fourth lens holding frame 11 urged frontward by the coil spring 56 from being disengaged from the first guide shaft 32 and the second guide shaft 34 and dropping off from the fifth lens holding frame 12. In other words, at the time of assembly of the lens barrel 1, assembly operations can be more efficiently performed by the protruding portion 61 thus provided.

The above-mentioned structure of the pair of the fourth lens holding frame 11 and the fifth lens holding frame 12 is applicable to other pairs of adjacent lens holding frames. When the structure is applied to at least two adjacent lens holding frames, tilting and backlash of lenses can be suppressed at the time of moving the lens holding frames. As a result, performance of the lenses of the lens barrel 1 can be enhanced. In particular, when the above-mentioned structure of the fourth lens holding frame 11 and the fifth lens holding frame 12 is applied to a lens barrel that requires high accuracy for relative positions and degrees of tilting of adjacent lenses that are subjected to movement control, performance of the lenses of this lens barrel can be enhanced.

What is claimed is:
1. A lens barrel, comprising:
a plurality of lens holding frames each comprising a cam follower;
a cam barrel comprising a cam groove formed to engage with the cam follower;
a straight guide barrel comprising a straight guide groove formed to engage with the cam follower,
the plurality of lens holding frames being movable through rotation of the cam barrel;
a first guide shaft and a second guide shaft, which are arranged parallel to an optical axis of the lens barrel and provided in one of at least one pair of adjacent lens holding frames among the plurality of lens holding frames, for guiding a movement of another of the adjacent lens holding frames in a direction of the optical axis;
a first guide receiving hole that allows the first guide shaft to be inserted therethrough and is guided by the first guide shaft; a second guide receiving hole that allows the second guide shaft to be inserted therethrough and is guided by the second guide shaft,
the first guide receiving hole and the second guide receiving hole being formed in the another of the adjacent lens holding frames;
a first urging means of urging the one of the adjacent lens holding frames and the another of the adjacent lens holding frames in one of a direction of being spaced apart from each other along the direction of the optical axis and a direction of being brought close to each other along the direction of the optical axis; and
a second urging means structured to apply an urging force to the another of the adjacent lens holding frames so as to rotate the another of the adjacent lens holding frames in a circumferential direction of the first guide shaft,
wherein the first guide receiving hole is held in abutment against an entire circumference of the first guide shaft at two positions that are spaced apart from each other in the direction of the optical axis;
the first guide shaft and the second guide shaft are arranged apart from each other in the circumferential direction about the optical axis;
the first urging means comprises a coil spring inserted onto the second guide shaft, and
the second receiving hole has an abutment surface abutting against the second guide shaft on a side of circumferential direction of the first guide shaft.

2. A lens barrel according to claim 1, wherein the second guide receiving hole has a size sufficient to allow an entire circumference of the second guide shaft to be loosely inserted therethrough.

3. A lens barrel according to claim 2, wherein the first urging means generates a repulsive force against the one of the adjacent lens holding frames so as to urge the another of the adjacent lens holding frames.

4. A lens barrel according to claim 1, wherein the cam follower of the another of the adjacent lens holding frames avoids engaging with the straight guide groove.

5. A lens barrel according to claim 1, wherein the first guide shaft and the cam follower of the another of the adjacent lens holding frames are arranged on the same side in a circumferential direction about the optical axis.

6. A lens barrel according to claim 1, wherein the one of the adjacent lens holding frames comprises an engagement portion for restricting a movement of the another of the adjacent lens holding frames in a direction of being spaced apart from the one of the adjacent lens holding frames along the direction of the optical axis.

7. A lens barrel according to claim 1, wherein the abutment surface is a flat surface orthogonal to the circumferential direction of the first guide shaft.

* * * * *